United States Patent [19]

Gage

[11] Patent Number: 5,282,188
[45] Date of Patent: Jan. 25, 1994

[54] APPARATUS AND METHOD FOR OPTIMIZING PERFORMANCE IN READ/WRITE HEAD OF AN OPTICAL STORAGE SYSTEM WITH A MAGNETO-OPTICAL STORAGE MEDIUM

[75] Inventor: Edward C. Gage, Rochester, N.Y.

[73] Assignee: Eastman Kodak Company, Rochester, N.Y.

[21] Appl. No.: 835,815

[22] Filed: Feb. 18, 1992

[51] Int. Cl.$^5$ .............................................. G11B 7/00
[52] U.S. Cl. ...................................... 369/110; 369/112
[58] Field of Search ................ 369/13, 44.12, 44.23, 369/44.24, 109–112

[56] References Cited

U.S. PATENT DOCUMENTS

| | | | |
|---|---|---|---|
| 4,729,122 | 3/1988 | Itoh | 369/110 X |
| 5,105,399 | 4/1992 | Shimonou | 369/110 X |
| 5,155,622 | 10/1992 | Kawatsuki et al. | 369/110 X |
| 5,161,133 | 11/1992 | Levenson | 369/110 X |

OTHER PUBLICATIONS

Challener et al., Jones matrix analysis of magneto optical media and read-back systems, Applied Optics, vol. 26, No. 18, Sep. 15, 1987, pp. 3974–3980.
Jones et al., A New Calculus for the Treatment of Optical Systems, J.O.S.A., vol. 31, 485, Jul. 1941, pp. 488–500.

Primary Examiner—W. R. Young
Attorney, Agent, or Firm—William W. Holloway

[57] ABSTRACT

In a read/write head for a magneto-optical storage system, a optical wave plate is positioned between the partial polarization beam splitter to which the radiation from the source is applied and the analyzing beam splitter which directs the two components of the radiation beam to the differential detection system. Using the techniques herein described, equations are developed which identify the optimal parameters for the optical wave plate. The equations are derived for the retardation of the optical wave plate and for the angle of the slow axis of the optical wave plate relative to the read/write head optical coordinates. These two equations are given in terms of the phase between the s and the p polarization components. The equations are applied to the specific example wherein TbFeCo is the magneto-optical material. The inclusion of a liquid crystal element having a voltage controlled retardance permits the read/write head to be used with "write once" optical storage media as well as magneto-optical storage media.

9 Claims, 5 Drawing Sheets

APPARATUS AND METHOD FOR OPTIMIZING PERFORMANCE IN READ/WRITE HEAD OF AN OPTICAL STORAGE SYSTEM WITH A MAGNETO-OPTICAL STORAGE MEDIUM

BACKGROUND OF THE INVENTION

1. Field of Invention

This invention relates generally to optical systems for the storage and retrieval of information and, more particularly, to the read/write head of the magneto-optical information storage system which directs radiation to the storage medium and then directs radiation resulting from the interaction with the medium to the radiation detectors.

2. Description of the Related Art

The optical storage systems, at present can generally be placed into one of two categories, the categories determined by the optical property used to identify different logical states on the storage medium. The first optical storage system can be referred to a differential absorption (or reflection) of a radiation beam impinging on the storage medium surface. In the differential absorption optical systems, each logical states are associated with changes in the intensity of a beam of radiation interacting with the storage medium. In the second category of optical storage systems, changes in the rotation of plane polarized beam of radiation are used to identify optical states. The present invention is directed to the second or the magneto-optical storage and retrieval systems and provides a technique for determining selected parameters in the optical path to enhance the identification of the two orientations of magnetic regions, orientations which encode the data stored on the disk.

Figure 1:
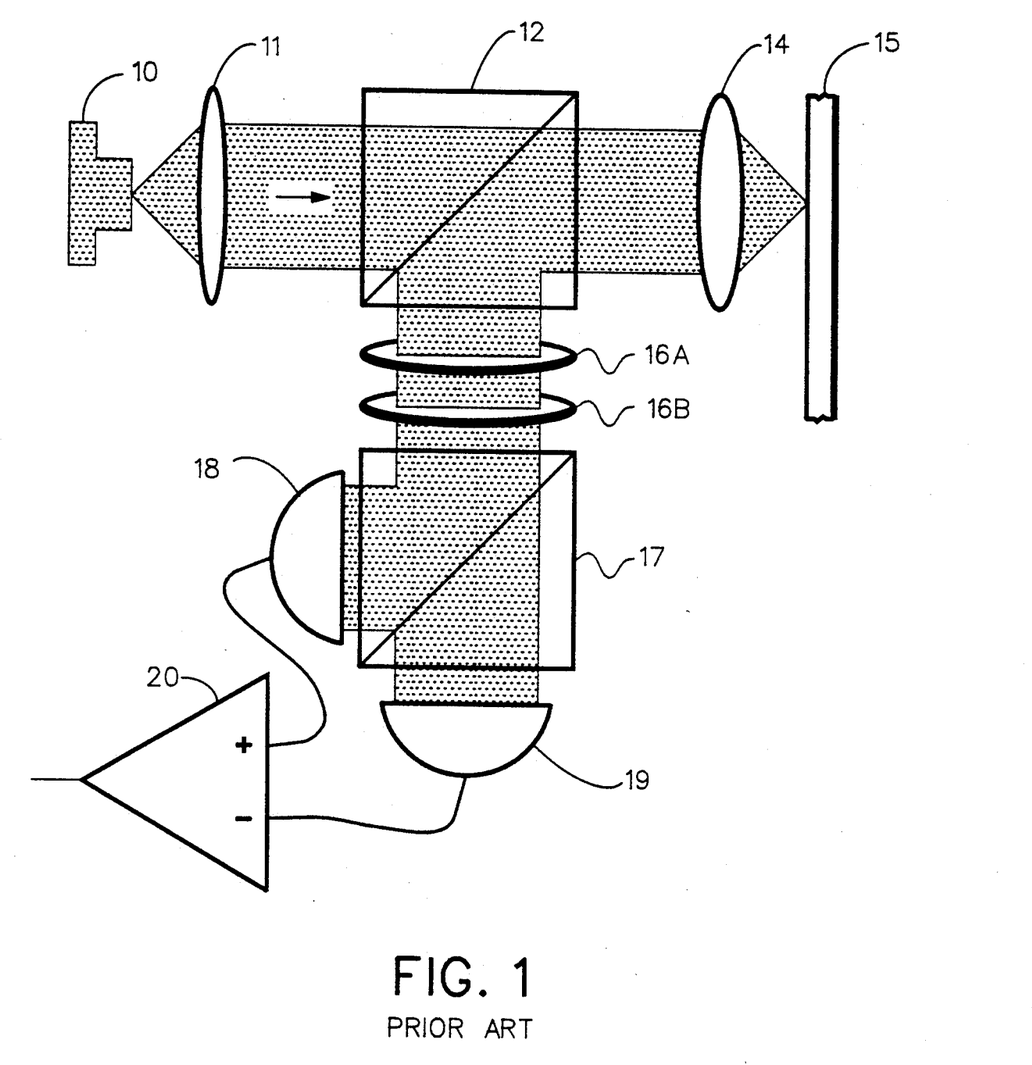
FIG. 1 is a block diagram of a prior art read/write head for an optical system used in detecting the differential absorption of regions on the storage medium.

Referring to FIG. 1, the implementation of the read/write head in a magneto-optical information storage system, the system relying on differential rotation of the planar polarization of a optical radiation caused by the interaction of the optical radiation with the storage surface, is shown. This type of storage system relies on the Kerr effect wherein the rotation of a plane of polarization is different when a magnetic material has a magnetic orientation parallel to or a magnetic orientation anti-parallel to the direction of the radiation interacting with the magnetic material, i.e., the differential change in polarization of a reflected beam depends upon the orientation of the magnetization of the local domain with which the radiation interacts. As with the implementation for detecting a change in reflected light amplitude, the radiation from a light source 10 is collimated by lens 11 and one plane of polarization is selected by passing the collimated beam through the partial beam splitter 12'. Because linearly polarized radiation can be considered to be comprised of two circularly polarized radiation components, the interaction with the magnetic layer forming a portion of storage medium 15 effects the two circularly polarized components differently. As a result, after interaction with the storage material, the reflected radiation is not linearly polarized parallel to the applied radiation, but an elliptical polarization of the reflected radiation results in a rotation of the reflected linear polarization due to the circular dichroism and the circular birefringence of the storage media. The reflected radiation is recollimated by objective lens 14. The recollimated beam is applied to beam splitter 12 and the components of the radiation beam orthogonal to the plane of polarization of the radiation impinging on storage medium, i.e., the components induced by the interaction, are reflected by the beam splitter 12. Some of the light with polarization parallel to the impinging radiation can also be reflected from the magneto-optic region. The radiation reflected by the beam splitter 12 is transmitted through a quarter wave plate 16A and a half wave plate 16B to correct for ellipticity introduced into the radiation beam. The polarization beam splitter 17 divides the radiation reflected from beam splitter 12 into radiation components which have been rotated by the interaction with the storage material. Each detector 18 and 19 receives a component resulting from one orientation of the magnetic regions of the storage medium interacting with the impinging radiation beam. The differential amplifier 20 is used to enhance the detectability of the small signals, the rotation due to the Kerr effect typically being less than 2° relative to reflected radiation which had not been subjected to differential interaction of the circularly polarized components with the optical storage material and to cancel the large DC component of the two radiation components.

In the optical storage systems using a magneto-optical storage medium, a need has been felt for a technique of determining how to optimize the parameters of the system in order to achieve the most detectable signal. In the article by W. A. Challener and T. A. Rinehart, "Jones Matrix Analysis of Magnetooptical Media and Read-Back Systems", Appl. Opt. 26, 3974 (1987), part of the problem of a differential detection system was addressed. In that article, the substrate birefringence and the wave plate tolerances were studied. However, the DC offset in the differential signal was not considered and a range of "ideal" wave plates was found, each with a sensitivity to the optical path birefringence. Therefore, the need has remained for generally applicable technique for identifying the parameters which would permit optimization of the detection of the state of the region of the storage system to which radiation was being applied.

SUMMARY OF THE INVENTION

The present invention is directed to addressing the short comings of the related art by identifying a technique by which the detectability of properties of radiation which has interacted a storage medium in a magneto-optical system. Briefly summarized, according to one aspect of the present invention, the retardation and angle (of the fast axis relative to the optic axis) of a wave plate in the optical path are determined in such a manner as to maximize the signal to noise ratio developed by the radiation detectors. Two equations are calculated for the parameters of the wave plate, one equation for the retardation parameter of the general wave plate and one equation for the angle between the x-axis of the optical components of the read/write head and the slow axis of the general wave plate. These are plotted to identify a range of values for these parameters in which the deviation from the an optimum signal to noise ratio is small.

These and other aspects, objects, features and advantages of the present invention will be more clearly understood and appreciated from a review of the following detailed description of the preferred embodiments and appended claims, and be reference to the accompanying drawings.

DESCRIPTION OF THE PREFERRED EMBODIMENTS

1. Detailed Description of the Figures

The operation of a magneto-optical read write head has been discussed with reference to FIG. 1.

Figure 2:
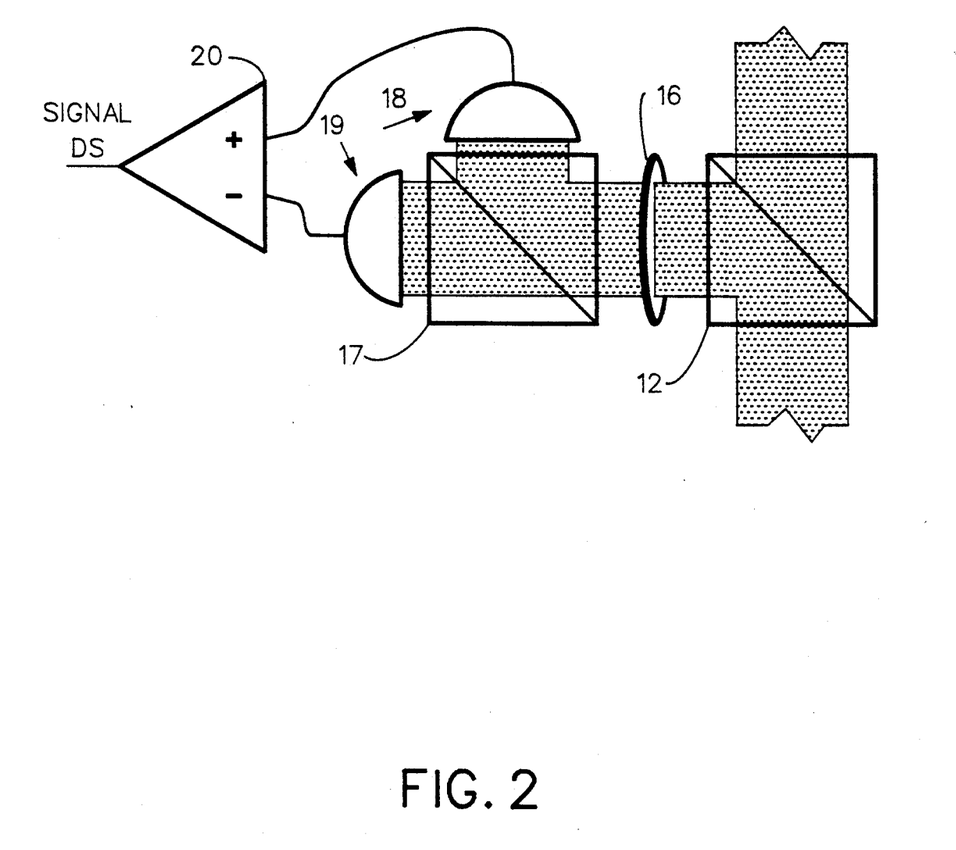
FIG. 2 is a block diagram of the portion of the read/write head for which the relationships of the present invention are relevant.

Referring to FIG. 2, a portion of FIG. 1 is displayed. However, in this Figure, the quarter wave 16A and the half wave plate 16B have been combined to form a general wave plate. The properties of this general wave plate are selected to optimize the signal by which the orientation of the magnetization of a selected region of the optical storage medium is determined, i.e., the signal from the differential detector.

The procedure in determining the optimum properties will be to follow the radiation through the optical head. The determination of the optimum properties of the wave plate are determined herein using the formalism described by R. C. Jones, J.O.S.A. 31, 488 (1941) entitled "A New Calculus for the Treatment of Optical systems".

Choosing a coordinate system wherein the x-axis is the p axis for the partial polarizing beam splitter 12, the field from the laser can be written, following the Jones formulation, as, $$\vec{E}_{Laser} = \sqrt{I_{Laser}} \begin{bmatrix} 1 \\ 0 \end{bmatrix}. \qquad 1.$$

The radiation is reflected from the optical storage medium 15. The polarization eigenstates for the magneto-optical storage medium are right hand and left hand circular polarization states. Upon reflection from the storage medium, the circular polarization states are unchanged except for being multiplied by the complex amplitude reflection coefficient for the medium, the reflection coefficients being slightly different for the two circularly polarized states. The reflection coefficients are expressed in terms of complex numbers, the coefficients of the right-hand and left-hand circularly polarized states being exchanged when the magnetization orientation of the storage medium is reversed. The reflection from the storage medium can be described by the matrix relationship, $$R_{M-O} = \frac{1}{2} \begin{bmatrix} 1 & 0 \\ 0 & -1 \end{bmatrix} \begin{bmatrix} r_r + r_l & i(r_l - r_r) \\ i(r_r - r_l) & r_r + r_l \end{bmatrix} \qquad 2.$$

The first matrix in the relationship preserves the sense of handedness for the coordinate system after reflection. When a linearly polarized state is reflected from the medium, an elliptically polarized radiation field is returned to the read/write head, the file being described by the relationship $$\vec{E}_{Ret} = \frac{1}{2} \begin{bmatrix} r_r + r_l & i(r_l - r_r) \\ i(r_l - r_r) & -r_r - r_l \end{bmatrix} \begin{bmatrix} 1 \\ 0 \end{bmatrix} = \frac{1}{2} \begin{bmatrix} r_r + r_l \\ i(r_l - r_r) \end{bmatrix} \qquad 3.$$

It is convenient to define $(r_r + r_l)/2 = r_{\parallel}$. When $r_r$ and $r_l$ are written in polar coordinates, $$R_r = r_r e^{i\phi_r} \qquad 4.$$

and $$r_l = r_l e^{i\phi_l} \qquad 5.$$

When the phase of the radiation field is properly selected, $$\vec{E}_{Ret} = |r_{\parallel}| \begin{bmatrix} 1 \\ \pm \delta e^{i\beta} \end{bmatrix} \qquad 6.$$

where $$\delta = \left( \frac{r_r^2 + r_l^2 - 2r_r r_l \cos(\theta)}{r_r^2 + r_l^2 + 2r_r r_l \cos(\theta)} \right)^{\frac{1}{2}}, \qquad 7.$$

$$\tan(\beta) = \frac{r_r^2 - r_l^2}{2r_r r_l \sin(\theta)}, \qquad 8.$$

$$\theta = \phi_r - \phi_l, \qquad 9.$$

and the $\pm$ sign depends on the state of the magnetization of the recording medium. Because of the $\pm$ sign, the range of $\beta$ can be limited to $-\pi/2 \leq \beta \leq \pi/2$, a range convenient for the arctangent function. $\delta^2$ is the ratio of intensity of the y polarization component to the intensity of the x polarization component and $\beta$ is the phase difference between the two field components. The reflected field is elliptically polarized with the angle between the major axis of the ellipse and the incident polarization given by the Kerr rotation angle $\theta_k$, $$\tan(2\theta_k) = \frac{2\delta \cos(\beta)}{\delta^2 - 1}. \qquad 10.$$

Figure 3:
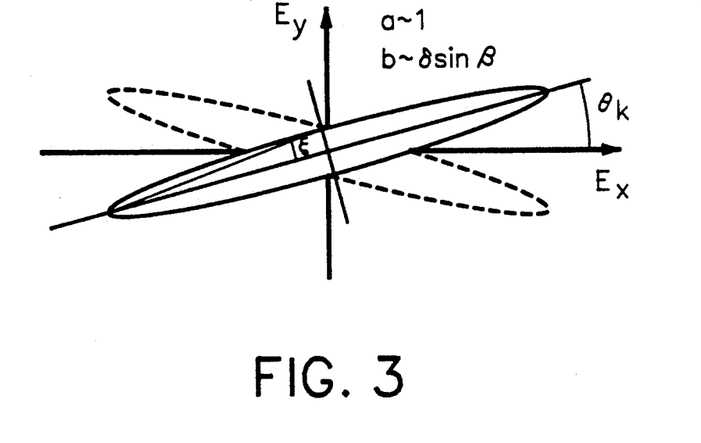
FIG. 3 is a diagram illustrating the polarization states of the radiation reflected from the storage medium.

Referring to FIG. 3, the elliptical radiation pattern resulting from reflection from the optical storage medium is shown with a=1 representing the major axis and b=$\delta \sin\beta$ representing the minor axes of the ellipse. For small Kerr rotations, the approximate relationship can be employed $$\theta_k \approx -\delta\cos(\beta)$$ 11.

and the ellipticity of the reflected polarization state is given by $$\epsilon \approx \delta\sin(\beta).$$ 12.

Figure 4:
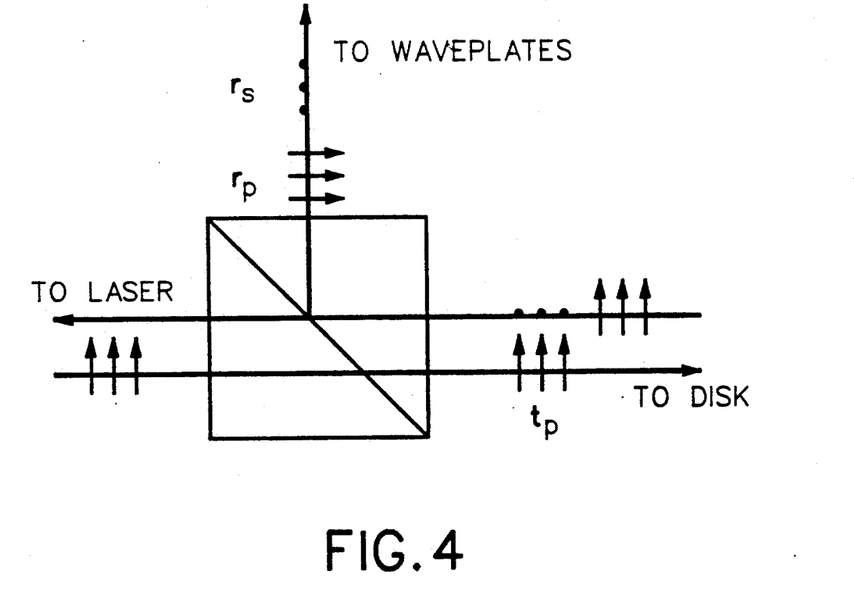
FIG. 4 is diagram illustrating the polarization states of the partial beam splitter.

After being reflected from the magneto-optical storage medium, the radiation beam is applied to the beam splitter. Referring to FIG. 4, the components of the radiation relative to the beam splitter are shown. A generally linearly polarized radiation beam from the (laser) radiation and after passing through the beam splitter with polarization $t_p$ applied to the storage medium. Upon reflection from the storage medium and reflection from the internal surface of the beam splitter 12, the radiation field has polarization components $r_p$ and $r_s$. After passing through beam splitter. The field, $E_{rbs}$, reflected from the beam splitter and applied to the wave plate is given by $$\vec{E}_{rbs} = \begin{bmatrix} r_p & 0 \\ 0 & r_s \end{bmatrix} R_{M-O} \begin{bmatrix} t_p & 0 \\ 0 & t_s \end{bmatrix} \vec{E}_{Laser}.$$ 13.

The ideal partial beam splitter PBS has $r=1$ and $t_s=0$. $r_p$ and $t_p$ will be arbitrary, but subject to the constraint $r_p^2 + t_p^2 = 1$. The phases of the complex coefficients are also arbitrary. Then, $$\vec{E}_{rbs} = \sqrt{R_p(1 - R_p)I_{Laser}} \, |r_\parallel| \begin{bmatrix} 1 \\ \pm \dfrac{\delta}{\sqrt{R_p}} e^{i\tilde{\beta}} \end{bmatrix}$$ 14.

where $R_p = r_p^2$ and $\tilde{\beta}$ is the phase delay between the s and p polarizations after exiting from the partial beam splitter. The phase delay is generalized to include the phase delay from the interaction with the magnetooptical medium, the special partial beam splitter, as well as any other retardation in the optical path of the radiation applied to the wave plate. (In order for the media birefringence to alter only $\beta$ and not $\delta$, the incident polarization must be along the fast or the slow axis of the media birefringence). Since these axes and the incident polarization are usually along the $r$ or $\theta$ of the optical medium, these assumptions are reasonable.

The beam splitter is not the only component of the read/write head which determines the efficiency of the optical system. The radiation beam will be attenuated by losses in the read/write head and other losses in other optical components. If $\eta_{LD}$ is selected as the fraction of the laster intensity that would arrive at the storage medium in the absence of beam splitter attenuation, then the head efficiency is given by, Head Efficiency$=\eta_{LD}(1-R_p)$. 15.

The intensity lost in the collection process back to the polarization analyzer $(1-\eta_{DL})$ will further reduce the light available for signal detection. Equation 14 becomes $$\vec{E}_{rbs} = \sqrt{\eta_{LD}\eta_{DL}R_p(1 - R_p)I_{Laser}} \, |r_\parallel| \begin{bmatrix} 1 \\ \pm \dfrac{\delta}{\sqrt{R_p}} e^{i\tilde{\beta}} \end{bmatrix}.$$ 16.

The matrix for the general wave plate (as formulated by Jones) is $$W(\phi,k) = \begin{bmatrix} \cos^2(\phi) + e^{ik}\sin^2(\phi) & \cos(\phi)\sin(\phi)(1 - e^{ik}) \\ \cos(\phi)\sin(\phi)(1 - e^{ik}) & \sin^2(\phi) + e^{ik}\cos^2(\phi) \end{bmatrix}$$ 17.

where $k$ is the phase delay ($2\pi\Delta n\, d/\lambda$), modulo $2\pi$, between the fast axis and the slow axis of the wave plate and $\phi$ is the angle between the x-axis of the optical system and the wave plates slow axis ($k>0$) (the p-axis of the partially polarizing beam splitter defines the x-axis of the optical system). When the signal optimization is done with a single wave plate, the incident radiation on the differential detection system is given by, $$\vec{E}_{Out} = W(\phi,k)\vec{E}_{Rbs}.$$ 18.

After expanding, $$\vec{E}_{Out} = M \begin{bmatrix} \cos^2(\phi) + e^{ik}\sin^2(\phi) + (1 - e^{ik})\cos(\phi)\sin(\phi)\delta' e^{i\tilde{\beta}} \\ (1 - e^{ik})\cos(\phi)\sin(\phi) + (e^{ik}\cos^2(\phi) + \sin^2(\phi))\delta' e^{i\tilde{\beta}} \end{bmatrix}$$ 19.

where $$M = \sqrt{\eta_{LD}\eta_{DL}R_p(1 - R_p)I_{Laser}} \, |r_\parallel|$$ 20.

and $$\delta' = \dfrac{\pm\delta}{\sqrt{R_p}}.$$ 21.

In order to proceed with the analysis, the differential signal, DS, must be considered. When the axis of the analyzer and the partial polarization beam splitter are aligned, the differential signal, DS, can be expressed $$DS = K_a \left| \begin{bmatrix} 1 & 0 \\ 0 & 0 \end{bmatrix} \vec{E}_{Out} \right|^2 - K_b \left| \begin{bmatrix} 0 & 0 \\ 0 & 1 \end{bmatrix} \vec{E}_{Out} \right|^2$$ 22.

where $K_a$ and $K_b$ are the responsivites of the individual detectors. Equation 22 can be expanded $$DS = M^2 K \Bigg[ \cos^2(2\phi) + \cos(k)\sin^2(2\phi) +$$

$$\dfrac{\Delta K}{K} \delta'(\sin(4\phi)\cos(\tilde{\beta})(1 - \cos(k)) + 2\sin(2\phi)\sin(k)\sin(\tilde{\beta})) \Bigg]$$ 23.

where $$K = \frac{K_a + K_b}{2} \text{ and } \Delta K = \frac{K_a - K_b}{2} \qquad 24.$$

and wherein only first order terms in $\delta$ and $\Delta K$ are retained. The measured analog waveform from the optical head a the output terminal of the differential amplifier should be DS times the transimpedance gain of the differential amplifier. The measured signal then has component independent of $\delta$ which we will call DC and term proportional to $\delta$ which is referred to as Sig. The DC term is the differential offset contributes to the noise. The calculate the shot noise from the differential detection system, the sum of the two photocurrents, SS, is given by $$SS = K_a \left| \begin{bmatrix} 1 & 0 \\ 0 & 0 \end{bmatrix} \vec{E}_{Out} \right|^2 + K_b \left| \begin{bmatrix} 0 & 0 \\ 0 & 1 \end{bmatrix} \vec{E}_{Out} \right|^2 \qquad 25.$$

Because $\delta$ changes sign in the data track, the average sum signal will be independent of $\delta$ in a first order approximation and is given by, $$SS = M^2(K + \Delta K(\cos^2(2\phi) + \sin^2(2\phi)\cos(k))). \qquad 26.$$

Figure 5:
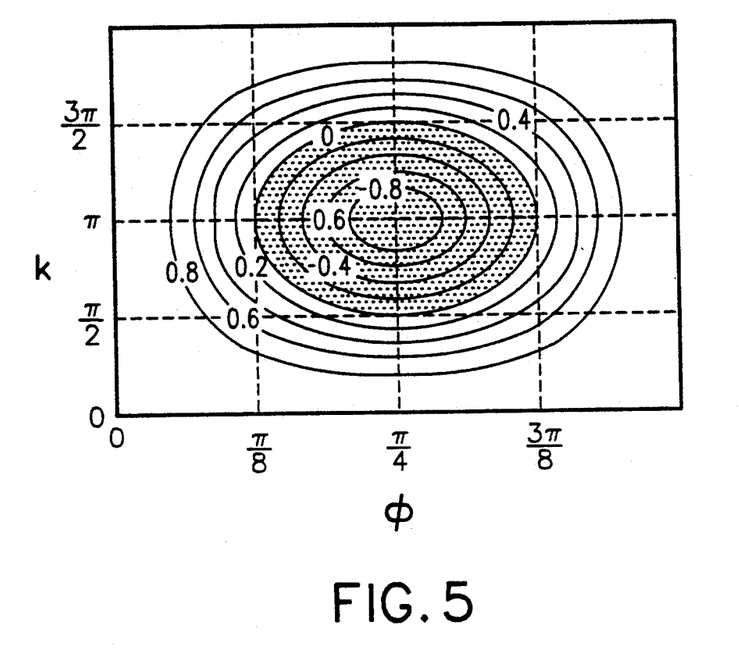
FIG. 5 is a contour plot of the normalized offset (DC) portion of the differential signal plotted as a function of the k and $\phi$, wherein k is the retardation and $\phi$ is the angle between the x axis and the slow axis of the wave plate.

In order to minimize the noise, the DC signal should be zero. IN the design of the system, $\Delta K = 0$. This constraint insures that the intensity is split evenly between the two detectors so that the noise associated with the laser and/or the storage media will be largely cancelled in the resulting differential signal. Expressed differently, the common mode noise rejection is maximized. In FIG. 5, a contour plot of $DC/(KM^2)$ is shown as a function of k and $\phi$. In this plot, the DC signal term is most sensitive to $\phi$ when $K = \pi$ (a half wave plate) and is most sensitive to k when $\phi = \pi/4$ (which would represent a quarter wave plate).

The DC term vanishes when $$\tan^2(2\phi) = \frac{-1}{\cos(k)} . \qquad 27.$$

From this equation, $\cos(k)$ must be negative or $$\pi/2 \leq k \leq 3\pi/2$$

$$\tan^2(2\phi) = \frac{-1}{\cos(k)} . \qquad 28.$$

in order that Equation 27 have a solution for a real $\phi$. Assuming that Equation 27 determines the orientation of the general wave plate, k can be chosen to maximize the signal as a function of phase shift $\tilde{\beta}$. Even when k is not exactly as designed, or the laser wavelength varies from a nominal value (hence changing k), the angle $\phi$ can be adjusted to compensate this change and eliminate the DC component as long as $k \leq \pi/2$.

A further problem which can arise is a lack of alignment between the partial polarizing beam splitter and the analyzing beam splitter, the lack of alignment adding an additional rotation in the system. The ability to rotate the analyzing polarizer is equivalent to placing a perfect half-wave plate between the general wave plate and the analyzing polarizer with the exception that the wavelength dependence of the retardation does not have to be considered. When $\xi$ is designated as the misalignment angle, a value of $\phi$ can be found where DC vanishes as long as, $$\sin^2(2\xi) \geq \frac{4\cos(k)}{(1 + \cos(k))^2} \qquad 29.$$

This condition is less stringent than the condition on k determined by Equation 27. Therefore, it should always be possible to orient a a general wave plate conforming to the conditions of inequality 28 and insure that DC is zero when $\Delta K = 0$.

Next we determine the general wave plates retardation to maximize the signal. Equation 27 indicates that the required orientation to the d.c. term to cancel as a function of k. Substituting Equation 27 into Equation 23 (subject to the conditions that $-\pi/2 \leq \leq \pi/2$), the normalized differential signal as a function of k and $\beta$ is given by, $$DS = 2M^2\delta'[\text{sign}(\tilde{\beta})\cos(\tilde{\beta})\sqrt{-\cos(k)} + \sin(\tilde{\beta})\sqrt{1 + \cos(k)}] \qquad 30.$$

Figure 6:
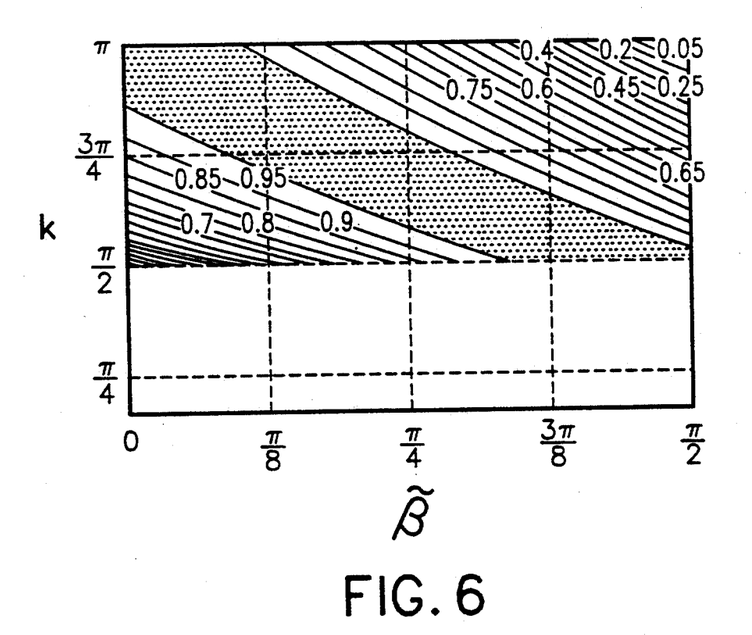
FIG. 6 is a contour plot of the normalized peak signal amplitude as a function of k and $\bar{\beta}$ where k is the retardation of the signal and $\bar{\beta}$ is the phase delay between the s and p polarization components of the reflected beam from the partial polarization beam splitter.

This Equation is plotted in FIG. 6. The maximum zero to peak signal amplitude is given by $$DS = \eta_{LD}\eta_{DL}K\sqrt{R_p}(1 - R_p)I_{Laser}|r_\parallel|^2 2\delta \qquad 31.$$

with the optimum retardation of the wave plate given by $$k = \arccos(-\cos^2(\tilde{\beta}))\frac{\pi}{2} \leq k \leq \pi \qquad 32.$$

and the optimum angle for the wave plate is given by $$\phi = \frac{1}{2}\arctan\left(\text{sign}(\tilde{\beta})\sqrt{\frac{-1}{\cos(k)}}\right)\frac{-\pi}{4} \leq \phi \leq \frac{\pi}{4} \qquad 33.$$

where the sign($\tilde{\beta}$) is + for $\tilde{\beta}$ in the first quadrant and − for $\tilde{\beta}$ in the fourth quadrant. Because of the properties of the arctan, $\phi$ needs only to cover the range $-\pi/4 \leq \phi \leq \pi/4$.

Figure 7:
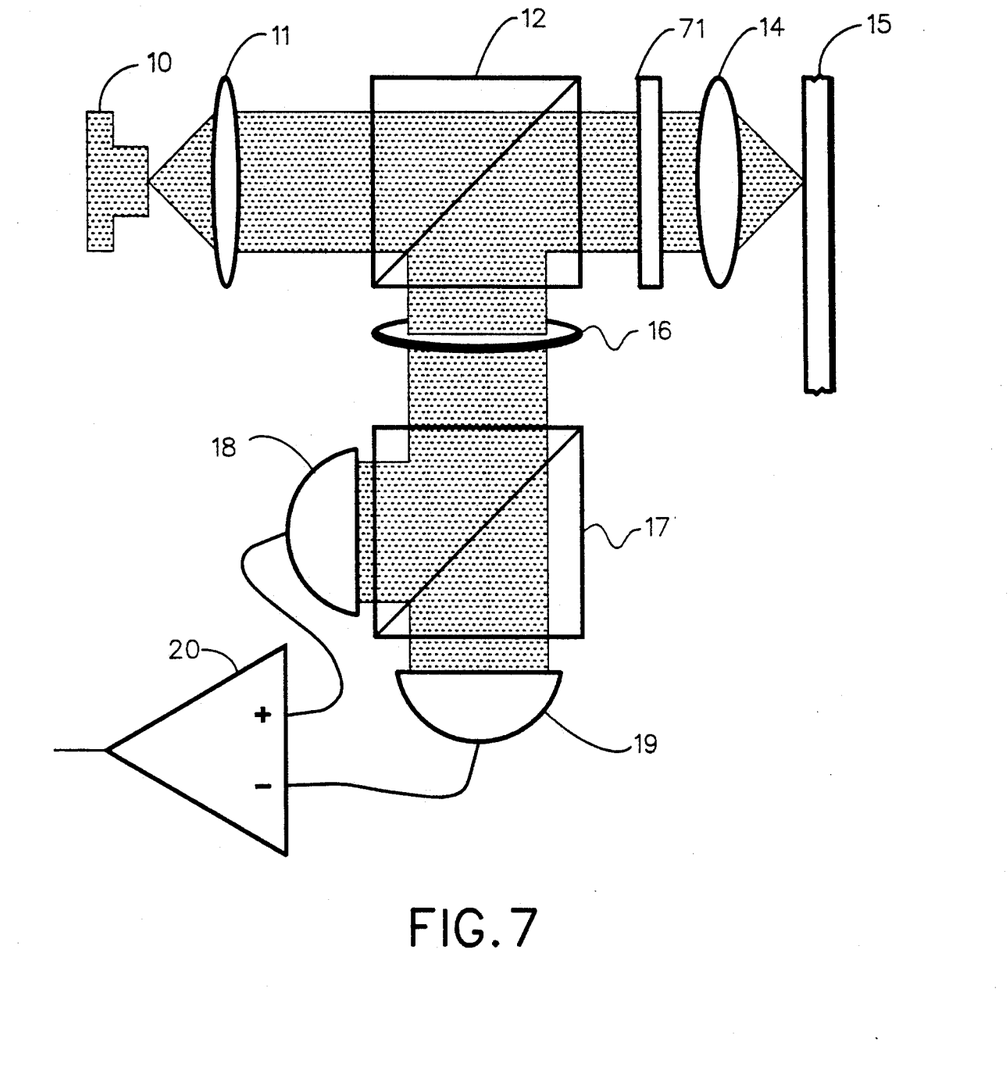
FIG. 7 is a block diagram of a read/write head similar to that of FIG. 1 in which selected components have been replaced by controllable liquid crystal elements.

Referring to FIG. 7, a read/head is shown which is similar to the read/write head of FIG. 1. However, a liquid crystal element 71 is positioned between the beam splitter 12 and the condensing lens 14. The liquid crystal cell 12 is of the type in which the properties are controlled by a voltage. In particular, the retardance of liquid crystal cell 71 is a function of voltage. Using this configuration, the general wave plate 16 is optimized according to the relationships defined by equations 32 and 33. When the voltage applied to liquid crystal element 71 results in substantially zero interaction with a transmitted radiation beam, then the read/write head is suitable for use with magneto-optical media. When the liquid crystal element 71 has voltage applied thereto which provides a 45° rotation of linearly polarized light, the read/write head is suitable for use with write once media. Thus, the read/write head of the configuration shown in FIG. 7 is suitable for either of the optical storage media typically used in optical storage and retrieval systems.

2. Operation of the Preferred Embodiment

Referring once again to FIG. 2, equation 32 determines the optimum retardation for the wave plate while Equation 33 determines the optimum angle of the slow axis for the general wave plate. One important feature of this design is that if the k value of the wave plate corresponds to $\beta'$ instead of $\tilde{\beta}$, then the DC term will vanish at an angle depending only on $\beta'$ and the signal will only be degraded as $\cos(\tilde{\beta}-\beta')$. This relationship is the reason that the reduction of the signal by only 5% includes a large portion of the contour plot of FIG. 5. Because wave plates of any retardation value are easily produced, then a convenient method of maximizing the common-mode noise reduction and signal for a given interface between a read/write head and a storage medium is provided.

The peak-to-peak differential signal provided by the photodetectors for a 50% duty cycle track on he storage medium. Typical complex reflection coefficients for magnetized TbFeCo are $r_r=0.70+0.25i$ and $r_l=0.71+0.24i$ where r and l refer to right- and left-handed circular polarization states, respectively. From the reflection coefficients for thick film TbFeCo, $\delta=0.00685$, $|r_\mu|=0.75$, and $\beta=37°$ for the linearly polarized incident state. These values yield a Kerr rotation angle of $0.31°$ (0.00547 radians) and an ellipticity of 0.0041. This very small Kerr rotation angle and the large phase shift $\beta$ complicate detection of a signal resulting from the interaction of a radiation beam with the optical storage media. By sandwiching the magneto-optical recording layer in a optical stack, $\delta$ or $\theta_k$ can be enhanced. Alternative media configurations (quadrilayers, superlattices, etc.,) can have larger values of $\beta$. Therefore, $\delta$ and not $\theta_k$ should be used as a figure of merit. When $\delta=0.00685$ and $\beta=37°$, then k=2.26 rads or 0.36 waves and $\phi=25.7°$ for optimum results. Then, with $\eta_{LD}=0.5$, $\eta_{DL}=0.71$, $I_{Laser}=4.3$ mW, $R_p=0.3$ (so that the intensity at the disk is 1.5 mW), and the detectors have a responsivity of 0.5 mA/mW, the peak signal before amplification is 4.4 $\mu$A. Because each detector has a photocurrent of $-44$ $\mu$A, the importance of minimizing the DC term is apparent.

While the invention has been described with reference to the read/write heads of optical storage systems, it is apparent that the invention is easily adapted to other devices that require the ability to control the retardance of a radiation beam and, in particular, to control the rotation of plane polarized radiation beams either to optimize performance or to adjust for aging effects of optical circuit parameters. While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. By way of specific example, several materials, in addition to the TbFeCo used as an example, show a Kerr effect suitable for use in a magneto-optical storage and retrieval system. The parameters will, however, be different. Using the technique described herein, the properties of a wave plate can be determined for the parameters of the selected magneto-optical material.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A read/write head for optical storage and retrieval systems using differential rotation of linear polarization of an optical beam to identify regions on a storage medium, said read/write head comprising:

a source of radiation for providing a radiation beam;
   a lens for providing a collimated radiation beam;
   a first partial polarization beam splitter responsive to said collimated radiation beam for providing a linearly polarized radiation beam;
   a lens for focusing said linearly polarized radiation beam on said storage medium, wherein said lens provides a recollimated radiation beam for radiation reflected by said storage medium, said recollimated radiation beam being applied to said first beam splitter, wherein said first beam splitter reflects a signal radiation beam;
   an optical wave plate having the properties that, an optimum retardation is given approximately by, $$k = \arccos(-\cos^2(\tilde{\beta}))\frac{\pi}{2} \leq k \leq \pi$$

where $\tilde{\beta}$ is the phase delay between s and p polarization components applied to said optical wave plate, and an angle between an x-axis of the head and a slow axis of the optical wave plate is approximately given by, $$\phi = \frac{1}{2}\arctan\left(\text{sign}(\tilde{\beta})\sqrt{\frac{-1}{\cos(k)}}\right)\frac{-\pi}{4} \leq \phi \leq \frac{\pi}{4}$$

a second beam splitter for receiving said signal radiation beam, said second beam splitter dividing said signal radiation beam into a transmitted signal beam and a reflected signal beam; and
   a first and a second radiation detector, said first radiation detector providing a first signal in response to said transmitted beam, said second detector providing a second signal in response to said reflected beam.

2. The read/write head of claim 1 wherein said second beam splitter can be rotated in order to optimize the signal to noise ratio of said read/write head.

3. The read/write head of claim 1 wherein said optical wave plate can be rotated in order to optimize the signal to noise ratio of said head.

4. The read/write head of claim 1 further comprising a voltage controllable liquid crystal cell, said liquid crystal cell having a first mode of operation wherein said liquid crystal cell is optically inactive with respect to said radiation beam, said liquid crystal cell having a second mode of operation wherein said liquid crystal cell is a quarter wave plate with respect to said radiation beam.

5. A read/write head for use in identifying optical properties of regions of a storage medium of an optical storage system, said read/write head capable of being adjusted for optimum performance and to respond to changing optical parameters, said read/write head comprising:

a radiation source for providing a collimated radiation beam;

a beam splitter responsive to a transmission of said collimated radiation beam for providing a linearly polarized radiation beam;

a lens for focusing said collimated radiation beam on said storage medium and for recollimating reflected radiation from said storage medium, wherein said reflected radiation is applied to said beam splitter, said beam splitter causing a signal radiation beam of said reflected radiation beam to be reflected therefrom;

a second beam splitter positioned to reflect a first signal portion and to transmit a second signal portion of said signal radiation beam; and a first radiation detector and a second radiation detector, said first radiation detector providing first electrical signal in response to said first signal portion, said second detector providing a second electrical signal in response to second signal portion, wherein a comparision of said first and said second electrical signals identifies a magnetic orientation of a region of said storage medium upon which said polarized radiation beam is focused; wherein said read/write head is characterized by having optical wave plate positioned between said beam splitter and said second beam splitter and having a retardance approximately defined by the relationship, $$k = \arccos(-\cos^2(\tilde{\beta}))\frac{\pi}{2} \leq k \leq \pi$$

said optical wave plate being further characterized by an angle between an x-axis of the optical system and a slow axis of said optical wave plate approximately defined by the relationship, $$\phi = \frac{1}{2} \arctan\left(\text{sign}(\tilde{\beta})\sqrt{\frac{-1}{\cos(k)}}\right)\frac{-\pi}{4} \leq \phi \leq \frac{\pi}{4}$$

wherein $\tilde{\beta}$ is the phase between the s polarization component and the p polarization component of the radiation beam being applied to said second beam splitter.

6. The read/write head of claim 5 further characterized by a rotatable optical wave plate, wherein rotation of said optical wave plate optimizes said angle $\beta$.

7. The read/write head of claim 5 wherein said second beam splitter can be rotated to optimize a signal to noise ratio for said read/write head.

8. The read/write head of claim 5 further characterized by a controllable liquid crystal cell, said liquid crystal cell having first mode of operation in which said liquid crystal cell is optically inactive to transmission of said radiation beam, said liquid crystal cell having a second mode of operation in which said liquid crystal cell is a quarter wave plate with respect to transmission of said radiation beam.

9. The method of optimizing performance of a read/write head of an optical storage system interacting with a magneto-optical storage medium, said read/write head of the type having a radiation source collimating lens, beam splitter and a condensing lens for applying radiation to storage medium; said condensing lens, said beam splitter, a second beam splitter, and two radiation detectors for determining an optical state of a selected region, said method comprising the steps of:

positioning an optical wave plate between said beam splitter and said second beam splitter; and selecting properties for said optical wave plate wherein a retardance is approximately defined by the relationship, $$k = \arccos(-\cos^2(\tilde{\beta}))\frac{\pi}{2} \leq k \leq \pi$$

said optical wave plate being further characterized by an angle between an x-axis of the optical system and a slow axis of said optical wave plate approximately defined by the relationship, $$\phi = \frac{1}{2} \arctan\left(\text{sign}(\tilde{\beta})\sqrt{\frac{-1}{\cos(k)}}\right)\frac{-\pi}{4} \leq \phi \leq \frac{\pi}{4}$$

wherein $\tilde{\beta}$ is the phase between the s polarization component and the p polarization component of the radiation beam being applied to said second beam splitter.

* * * * *